March 18, 1969     G. E. SONNTAG     3,434,153
RECORDER WITH SELF-ERASING CHART
Filed June 15, 1967
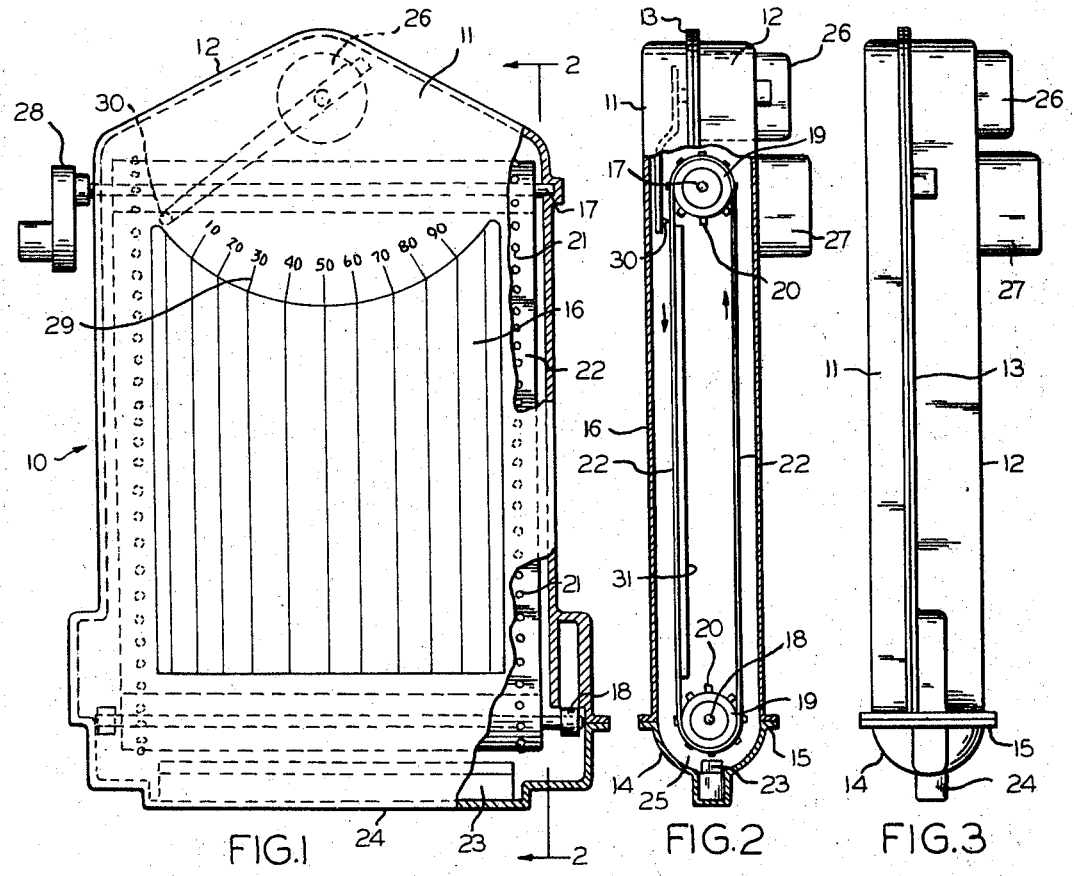
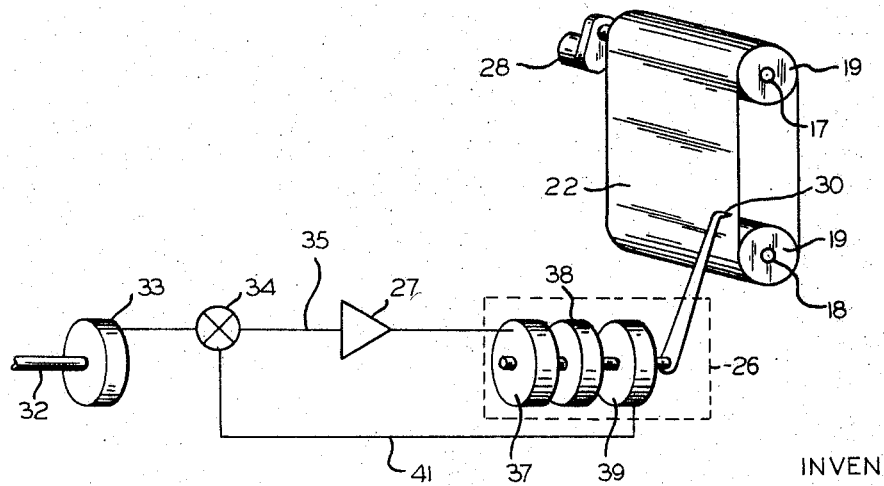
INVENTOR
GEORGE E. SONNTAG
ATTORNEY

United States Patent Office 3,434,153
Patented Mar. 18, 1969

3,434,153
RECORDER WITH SELF-ERASING CHART
George E. Sonntag, 10555 W. Spencer Place,
Milwaukee, Wis. 53224
Filed June 15, 1967, Ser. No. 646,355
U.S. Cl. 346—21
Int. Cl. G01d 9/12
4 Claims

ABSTRACT OF THE DISCLOSURE

A recording device equipped with a self-erasing chart wherein a powder is stored in the device and disposed to make frictional contact with the chart. A stylus, driven in response to a signal, wipes away the powder from the face of the chart. A means is provided for charging the chart to cause the powder to adhere to the chart.

---

My invention relates to recording devices, and more particularly to a recording device equipped with a self erasing tape, or chart.

The prime object of my invention is to provide a device that provides a visible recording chart that may be erased automatically, to eliminate the time consumed and the expense of replacing the tape.

Another object of my invention is to provide a device of the character described, that may have the chart, or tape coated and erased by magnetic means, or by a conventional brush.

Still another object is to provide a self-contained unit that may be constructed as a portable unit adaptable for use on an automotive vehicle, or the like, or as a stationary unit applied to a stationary mechanical device.

A further object of the invention is to provide a device in which the registration may be governed by the speed of the vehicle, or by the magnitude in the performance of an operation, both being shown in reference to time.

It is manifest to anyone familiar with the art, that a recording device actuated by, for example, a speedometer on an automotive vehicle, has a definite purpose to record the variations in the speed and acceleration of the vehicle. There are also many instances in which a recording performance within a particular time element, is an advantage.

The device described, illustrated and claimed herein, functions as a unit adaptable to any drive. The chart, or tape may be provided with an electromagnetic charge, and the magnetic powder could be removed from the tape, or reorientated by magnetic means, or the tape may have the powder removed, or reorientated by means of a conventional brush or wiper blade. It is possible to accomplish the above, with an electrostatic charge on the tape, and a non-magnetic powder, an electrostatic charging plate would then be required.

The device is simple in construction, inexpensive to produce, and may be driven by diversified means, yet is highly efficient for the purpose for which it is intended.

Other and further objects of the invention will become more apparent as the description proceeds, when taken in conjunction with the drawings, in which:

FIGURE 1 is a plan view partly in cross-section, illustrating the complete assembled device constituting my invention;

FIGURE 2 is a fragmentary cross-sectional view of the device taken at the line 2—2 in FIGURE 1;

FIGURE 3 is a side elevation of the assembled device, and

FIGURE 4 is a schematic layout of a suggested system for the actuation of the device.

Similar characters of reference indicate corresponding parts and features throughout the several views, and referring now to the same, the character 10, illustrates generally the enclosure, consisting of a front portion 11, and a rear portion 12, each equipped with flanges shown as 13 to permit their attachment to one another in any efficient and practical manner.

There is a lower cap member shown as 14, also equipped with flanges 15 for engagement with the flange 13 of the body sections shown as 11 and 12.

The entire unit generally shown as 10, may be constructed preferably of a non-magnetic material such as plastic, or the like, with a transparent face shown as 16.

There is a top shaft 17, and a bottom shaft 18, mounted in conventional bearings as shown. The shafts 17 and 18 are equipped with sprockets 19 having outwardly extending teeth 20, which teeth engage apertures 21 disposed near the outer edge of a chart or endless tape 22, which tape 22 may be constructed of plastic or the like with iron powder magnetized and dispersed in a uniform manner. Also pigments may be in the tape to make it contrast with the loose powder in the device.

There is shown a magnet 23 disposed within the recessed portion 24, of the lower cap 14, which magnet 23 retains, or collects the loose iron powder shown as 25 (see FIG. 2), and maintains the tape 22 in a slightly magnetized condition.

The torquer damper and generating assembly is shown generally as 26, and the D.C. amplifier as 27. The upper shaft 17 is shown driven at 28, by a D.C. motor with a conventional gear reduction which may, or may not have clock escapement for actuation of the chart, or tape 22.

By refining to FIG. 1, I show numbers and grids 29 which are embossed on the transparent face 16, or printed on a transparent decal which is applied to the transparent portion 16 of the enclosure 11.

The iron powder 25, in the lower cap 14, erases trace by frictional contact with the tape also, and a small amount clings to the tape 22 as a coating, and the low friction plastic tipped stylus 30 (see FIG. 2), wipes away the iron powder from the face of the chart 22, exposing the pigmented surface.

The plate 31, mounted in any convenient manner, supports the tape 22 when the stylus 30 contacts the tape.

The stylus drive is an electrical feed back system, designed to overcome the friction of the stylus 30, rubbing on the tape 22.

The schematic layout shown in FIG. 4, shows the input shaft as 32 for driving the input signal generator 33, which generator would have the voltage output proportional to the input to determine the r.p.m. The voltage comparison bridge is shown as 34, the differential voltage output 35 has a D.C. amplifier 27 and leads to the D.C. torquer, the magnet damper 38, and the reference signal generator 39 with the output voltage proportional to the shaft position.

The torque 37, the damper 38, and the reference signal generator 39, are shown as a single assembly 26 by the dotted lines. The feed back voltage is shown as 41 and leads from the voltage comparison bridge 34, to the reference signal generator 39. Obviously other stylus drives that overcome the friction between the stylus 30 and the tape 22 may be employed.

I claim:

1. A recording device equipped with a self erasing tape comprising:

a pair of spaced apart rotatably mounted sprockets with self erasing tape extending therearound, driving means associated with one of said sprockets in order that said one sprocket can drive said tape around said sprockets at a constant speed, said tape having a chart impressed thereon,
a powder stored in said machine and disposed to make frictional contact with said tape,
means for charging said tape to cause said powder to adhere to said tape,
a stylus that is rotatably mounted on said machine and is positioned for contact with said tape, and
said stylus being actuated a certain distance that is a function of the magnitude of an electrical impulse whereby impressions are made on said tape while said tape is moving around said sprocket.

2. A recording device as defined in claim 1 wherein said charging means comprises a magnet mounted in said case juxtaposed to said tape, and
wherein said powder is a powdered magnetic material.

3. A recording device as defined in claim 1 wherein said stylus includes a plastic tip for contacting said tape and thereby moving said powder to draw lines on said tape.

4. The recording device as defined in claim 3 wherein said tape is an endless tape and is erased once per cycle.

References Cited

UNITED STATES PATENTS

| | | | |
|---|---|---|---|
| 1,252,102 | 1/1918 | Erdle | 346—21 |
| 1,706,046 | 3/1929 | Tisdale | 346—21 |
| 2,663,609 | 12/1953 | Jones | 346—18 X |
| 3,088,788 | 5/1963 | Brown et al. | 346—117 X |
| 3,343,175 | 9/1967 | Schweitzer | 346—77 |

RICHARD B. WILKINSON, *Primary Examiner.*

J. W. HARTARY, *Assistant Examiner.*